Dec. 18, 1923.  
J. W. FOLEY  
NIGHT AND DAY AUTO SHADE  
Filed Sept. 8, 1922
1,478,276
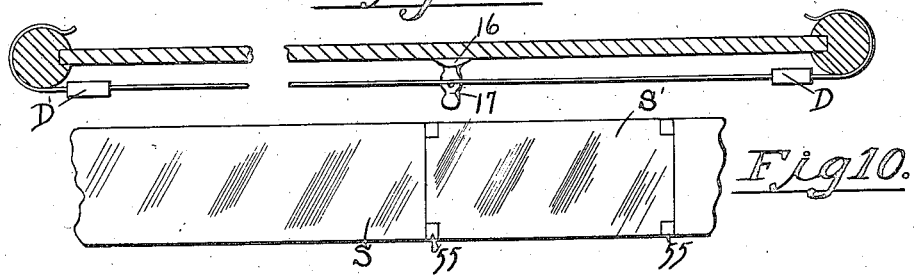
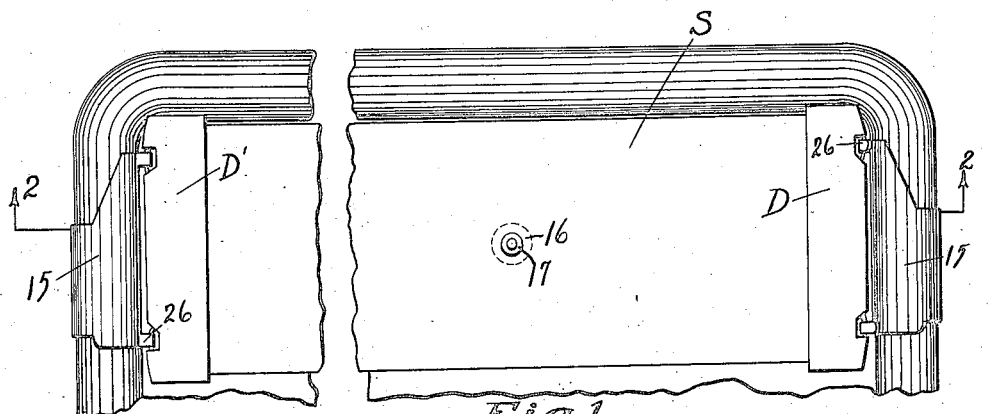
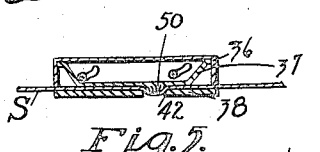
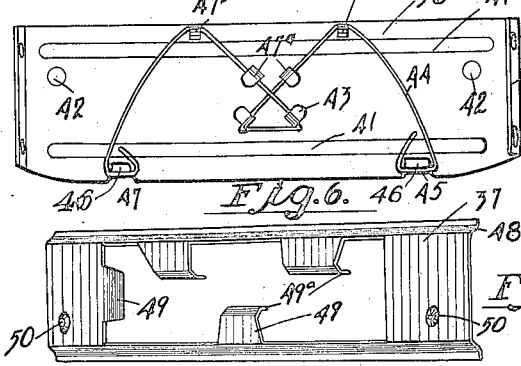
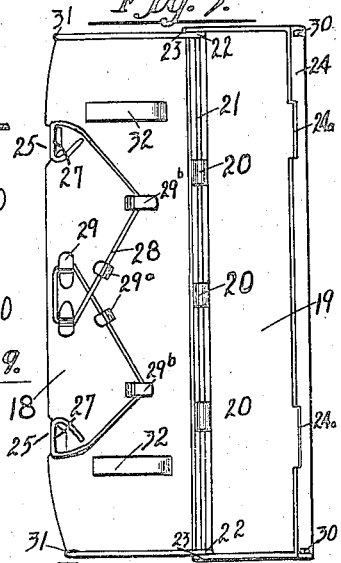
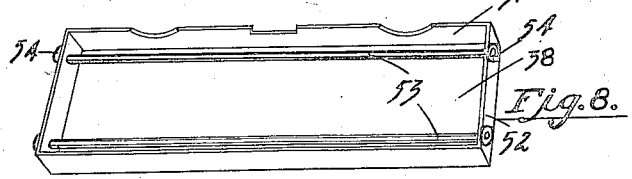
INVENTOR  
Joseph W. Foley  
by Hazard and Miller  
ATT'YS.

Patented Dec. 18, 1923.

1,478,276

UNITED STATES PATENT OFFICE.

JOSEPH W. FOLEY, OF LOS ANGELES, CALIFORNIA.

NIGHT AND DAY AUTO SHADE.

Application filed September 8, 1922. Serial No. 586,826.

*To all whom it may concern:*

Be it known that I, JOSEPH W. FOLEY, a citizen of the United States, residing at Los Angeles, in the county of Los Angeles and State of California, have invented new and useful improvements in Night and Day Auto Shades, of which the following is a specification.

My invention relates to light shades or screens for automobile windshields, and particularly to that type of shade embodied in my copending application Serial No. 548,109, filed March 30, 1922.

It is a purpose of my present invention to provide a shade or screen in which the flexible shade element is rigidly and adjustably sustained upon a windshield frame, and novel attaching means for yieldably securing the shade element in spanning relation to a windshield.

Although I will describe only one form of shade embodying my invention and point out the novel features thereof in claims, it is to be understood that various changes and modifications may be made without departing from the spirit of the invention and the spirit and scope of the appended claims.

In the accompanying drawings,

Figure 1 is a view showing in rear elevation a windshield having applied thereto one form of shade embodying my invention;

Figure 2 is a longitudinal sectional view taken on the line 2—2 of Figure 1;

Figure 3 is an enlarged detail view showing one of the attaching devices comprised in the shade shown in the preceding views in open position;

Figure 4 is a top plan view of the attaching device shown in Figure 3 in closed position;

Figure 5 is a top plan view of the attaching device shown at the left hand end of the shade element in Figure 1;

Figure 6 is an enlarged detail view of one of the elements comprised in the attaching device shown in Figure 5;

Figures 7 and 8 are views similar to Figure 6 showing two other elements comprised in the attaching device shown in Figure 5;

Figure 9 is a view showing in end elevation the element shown in Figure 6;

Figure 10 is a fragmentary view of the shade element comprised in the shade shown in Figure 1, with an auxiliary shade element in applied position thereon.

Similar reference characters refer to similar parts in each of the several views.

Referring specifically to the drawings, and particularly to Figure 1, my invention, in its present embodiment, comprises a strip S formed of flexible and translucent material, such as green celluloid, and this strip is adapted to be held in spanning relation to a portion of the windshield by means of clamps or clips 15 and attaching devices D and D'. As shown in Figure 1, the attaching devices D and D' embrace the opposite ends of the strip S, while the clamps 15 are connected to the attaching devices and are formed to embrace vertical portions of the windshield frame, as clearly shown in Figure 2. A suction cup 16 is provided with a shank 17 which extends through the strip S at a point medially of its ends to provide a handle for connecting the cup to the glass of the windshield and to thereby provide means for rigidly sustaining the strip between its ends so as to prevent undue vibration thereof.

The attaching device D is shown in Figure 3 as comprising plates 18 and 19 hingedly connected to each other to occupy an open position as shown in Figure 3 or a closed position as shown in Figure 1. The hinged connection comprises in the present instance sleeves 20 formed on the plate 19 and through which is extended a resilient rod 21. The opposite ends of the rod 21 engage within suitable openings formed in lips 22 extending from the opposite ends of the plate 18, it being particularly noted that the ends of the rod will not extend into similar lips 23 formed in the opposite ends of the plate 19. The plate 19 is provided along its transverse edges and one vertical edge with flanges 24, which cooperate with the plate in forming a cover for the plate 18. The vertical flange 24 is recessed as indicated at 24ᵃ to cooperate with similar recesses 25 formed in the plate 18 to accommodate the hooks 26 of the clamp 15 and eyes 27 of a spring 28. The spring 28, as clearly shown in Figure 3, is carried at the inner side of the plate 18 by means of securing tongues 29 formed by outstriking the plate and then bending the tongues to firmly engage the spring. For the purpose of allowing of the requisite expansion and contraction of the spring 28 but at the same time to prevent distortion or displacement thereof, lugs 29ª are arranged on the inner side of the plate 18 to limit the inward movement of the spring, and lugs 29ᵇ are arranged to limit the outward movement of the spring. These lugs 29ª and 29ᵇ are formed by outstriking the plate so as to engage the spring at opposed sides.

The vertical flange 24 is formed adjacent its ends with openings 30 which are adapted to receive lugs 31 formed on the opposite ends of the plate 18 for securing the plate 19 in closed position with respect to the plate 18. By virtue of the hinge connection between the plates 18 and 19, it will be clear that the rod 21 allows of a limited movement of one plate with respect to the other, and this movement is sufficient to permit the lugs 31 engaging within the openings 30 when the cover plate 19 is moved to closed position. During movement of the plate 19 to closed position, a slight shifting of such plate is effected against the tension of the rod 21 so that when the plate is in finally closed position, the rod 21 is held under tension, thus insuring of the lugs 31 being retained within the openings 30.

For securing one end of the strip S within the attaching device D, the plate 18 is provided with spring tongues 32 which are adapted to cooperate with the plate 19 in securing a metal strip 35 between the plates 18 and 19. As shown in Fig. 4, this strip 35 is permanently attached to the corresponding end of the shade element S so that the spring tongues 32 can be inserted between the strip 35 and the strip S thereby securely retaining the strip S within the attaching device D.

The attaching device D' consists of three elements designated generally at 36, 37 and 38 in Figures 6, 7 and 8, respectively. The element 36 comprises a plate bent at its ends to form flanges 39 provided with slots 40 which, as shown in Figure 5, are arranged diagonally of the flange and are formed with offset ends. The plate is also provided with longitudinally extending beads 41 for the purpose of reinforcing the latter, as will be understood. Openings 42 are provided in the plate 36 adjacent the ends thereof. The plate is outstruck to provide tongues 43 which embrace the intermediate portion of a wire spring 44 arranged at the inner side of the plate 36, and the opposite ends of the spring 44 are bent to provide eyes 45 which are adapted to engage hooks 26 of the corresponding clamp 15. At this point the edge of the plate 36 is recessed as indicated at 47 to allow of the engagement of the eyes by the hooks. To prevent distortion and displacement of the spring 44, the plate 36 is outstruck to provide lugs 47ª and 47ᵇ positioned on the plate in the same manner as the lugs 29ª and 29ᵇ of the plate 18.

The element 37 is adapted to be placed at the inner side of the element 36, and this element is shown as consisting of a plate bent along its longitudinal edges to provide flanges 48 offset with respect to the intermediate portion of the plate. The intermediate portion of the plate is constructed to provide fingers 49 which have offset ends 49ª that project above or to one side of the plate so as to be engaged by the element 38 when the elements are properly assembled. Adjacent the opposite ends of the plate 37 relatively sharp lugs 50 are formed which are adapted to engage within the openings 42 for a purpose which will be hereinafter described.

The element 38 constitutes a cover plate, and as shown in Figure 8 is provided along its edges with flanges 51 and 52. The flanges 51 are recessed as shown so as to cooperate with the recesses 47 in accommodating the eyes 45 in the hooks 46. The end flanges 52 are formed with openings through which extend the opposite ends of rods 53, and the ends of the rods 53 are engaged by lips 54 formed integrally with the flanges 52 and designed for the purpose of preventing longitudinal shifting of the rods within the plate.

In the assembly of the elements 36, 37 and 38, the element 37 is interposed between the elements 36 and 38, as clearly shown in Fig. 5, and with the cover plate 38 in one extreme position wherein the rods 53 are disposed at the offset ends of the slots 40, there is sufficient space provided between the elements 37 and 38 to allow the insertion of the adjacent end of the strip S. After the strip end has been inserted, the cover plate 38 is moved to force the rods toward the inner ends of the slots 40, and because of the diagonal arrangement of the slots, it will be clear that they function as cams in drawing the plates 36 and 38 together. During this operation, the projections 50 engage the strip S so that during movement of the cover plate 38, the strip is pulled taut, and in the final position of the cover plate, the projections move into the openings 42 thereby penetrating the strip and securely locking the latter within the attaching device. As a further means for securing the strip within the attaching device, the offset ends 49ª of the fingers 49 are engaged by the cover plate 38 so that during movement of the plate 38 to clamping position, an inward pressure is exerted upon the fingers so as to cause the latter to firmly engage the strip S.

From the foregoing operation, it will be clear that the strip S is adjustable within the attaching device D so that the shade as a whole can be applied to any windshield irrespective of its length, it being understood that that portion of the strip projecting from the attaching device D' can be cut off.

In the applied position of the shade to a windshield, as shown in Figure 1, the springs 28 and 44 of the attaching devices D operate in conjunction with the clamps 15 to resiliently sustain the shade strip S in spanning position upon the windshield and in conjunction with the suction cup 16 positively prevents undue vibration of the windshield.

As shown in Figure 10, the strip S is provided with an auxiliary strip S' formed of the same material. This auxiliary strip is relatively short and is provided at its corners with brackets 55 to slidably sustain the strip upon the strip S so that it may be adjusted longitudinally of the latter to intercept the vision of the operator of the vehicle when approaching a source of light of great intensity. When the auxiliary strip is not in use it may be shifted to either end of the strip S, as will be understood.

I claim as my invention:

1. A shade of the character described comprising a translucent member of flexible material and attaching means at the ends of the member, one of said attaching means comprising elements hingedly connected to each other to occupy open and closed positions, means on one of the elements for detachably securing the translucent member between the elements, and a resilient member carried by one of the elements and to which a clamping device is adapted to be connected.

2. A shade of the character described comprising a translucent member of flexible material and attaching means at the ends of the member, one of said attaching means comprising elements hingedly connected to each other to occupy open and closed positions, means on one of the elements for detachably securing the translucent member between the elements, a resilient member carried by one of the elements and to which a clamping device is adapted to be connected, the other of said attaching means comprising a pair of elements and a third element interposed between the first two elements, the intermediate element and one of the other elements being provided with connecting means for adjustably retaining one end of the translucent member between the elements, and a resilient member carried by one of the elements and to which another clamping device is adapted to be attached.

3. A shade of the character described comprising a translucent member of flexible material, and attaching means at each end of the member, one of said attaching means including plates, latching means on the plates, and means for hingedly connecting the plates whereby said plates may occupy open and closed positions, and to allow relative shifting thereof to maintain said latching means active when the plates are in closed position.

4. A shade of the character described comprising a translucent member of flexible material, and attaching means at each end of the member, one of said attaching means including plates, latching means on the plates, and means for hingedly connecting the plates whereby said plates may occupy open and closed positions, and to allow relative shifting thereof to maintain said latching means active when the plates are in closed position, the other of said attaching means including locking means for one end of the translucent member, said locking means being shiftable to occupy locking or non-locking positions.

5. A shade of the character described comprising a translucent member, and attaching means at each end of the member, one of said attaching means comprising hinged plates, and a spring carried by one of the plates for the purpose described.

6. A shade of the character described comprising a translucent member, and attaching means at each end of the member, one of said attaching means comprising hinged plates, a spring carried by one of the plates, the other of said attaching means including plates, coacting locking means carried by the plates, and means for shiftably sustaining the plates with relation to each other to cause said locking means to occupy locking or non-locking position.

7. A shade of the character described comprising a translucent member, attaching means at each end of the member, one of said attaching means comprising hinged plates, a spring carried by one of the plates, the other of said attaching means including plates, coacting locking means carried by the plates, means for shiftably sustaining the plates with relation to each other to cause said locking means to occupy locking or non-locking position, and resiliently sustained eyes carried by the attaching devices.

8. A shade of the character described comprising a strip of translucent material adapted to be arranged transversely across a windshield, and an auxiliary strip carrying supporting elements slidably mounted upon the first strip.

9. A shade of the character described comprising a translucent member of flexible material, and attaching means at each end of the member, one of said attaching means comprising a pair of plates, and a third plate interposed between the first two plates, one of the first plates being provided with cam slots, rods carried by the other of the first plates, and extending through said slots, and coacting locking means formed on one of the first plates and on the intermediate plate for engagement with the end of said member, said locking means being arranged to occupy locking or non-locking position according as one plate is shifted so that said rods are disposed at one end of the slots or the other.

10. In an attaching means for shades, a pair of plates, and a flat wire spring secured to one of the plates to provide spaced resilient arms mounted for limited movement transversely between the plates and having projecting ends formed with eyes.

11. A shade of the character described comprising a translucent member of flexible material, and attaching means at each end of the member, one of said attaching means comprising a pair of plates, and a third plate interposed between the first two plates, one of the first plates being provided with cam slots, rods carried by the other of the first plates, and extending through said slots, coacting locking means formed on one of the first plates and on the intermediate plate for engagement with the end of said member, said locking means being arranged to occupy locking or non-locking position according as one plate is shifted so that said rods are disposed at one end of the slots or the other, and a resilient member between certain of the plates and adapted for connection to an attaching element for the purpose described.

12. A shade of the character described comprising a translucent member, and an attaching device adapted to be secured to one end of the member and comprising plates, coacting locking means carried by the plates, and means for shiftably sustaining the plates with relation to each other to cause said locking means to occupy locking or non-locking position.

13. A shade of the character described comprising a translucent member, and an attaching device adapted to be secured to one end of the member and comprising plates, coacting locking means carried by the plates, means for shiftably sustaining the plates with relation to each other to cause said locking means to occupy locking or non-locking position, and a resilient member associated with the plates and adapted for connection to a clamp for the purpose described.

14. In an attaching means for shade strips, a pair of plates, and a third plate interposed between the first two plates, one of the first plates being provided with openings, projections formed on the intermediate plate and adapted to coact with said openings to provide locking means for said strip, and means for sustaining that plate formed with openings for movement to cause the openings to move into or out of registration with the projections.

15. In an attaching means for shade strips, a pair of plates, and a third plate interposed between the first two plates, one of the first plates being provided with openings, projections formed on the intermediate plate and adapted to coact with said openings to provide locking means for said strip, means for sustaining that plate formed with openings for movement to cause the openings to move into or out of registration with the projections, and a spring including spaced resilient arms carried by one of the plates for the purpose described.

16. In an attaching means for shade strips, a pair of plates one receiving the other, and the latter being formed with spaced fingers and projections, a third plate mounted for sliding and lateral movement with respect to the first plates, the last plate being formed with openings adapted to cooperate with the projections for securing said strip between the plates, and a spring carried by the last plate for the purpose described.

17. In an attaching means for shade strips comprising a pair of elements and a third element interposed between the first two elements, the intermediate element and one of the other elements being provided with connecting means for adjustably retaining one end of the shade strip between the elements, and a resilient member carried by one of the elements and to which a clamping device is adapted to be attached.

In testimony whereof I have signed my name to this specification.

JOSEPH W. FOLEY.